C. A. HAGADONE.
CUTTING MECHANISM.
APPLICATION FILED JULY 12, 1916.

1,257,342.

Patented Feb. 26, 1918.

Inventor.
Clinton A. Hagadone,
By
Atty.

UNITED STATES PATENT OFFICE.

CLINTON A. HAGADONE, OF WESTERN SPRINGS, ILLINOIS, ASSIGNOR TO INTERNATIONAL HARVESTER COMPANY OF NEW JERSEY, A CORPORATION OF NEW JERSEY.

CUTTING MECHANISM.

1,257,342.   Specification of Letters Patent.   Patented Feb. 26, 1918.

Application filed July 12, 1916. Serial No. 108,941.

*To all whom it may concern:*

Be it known that I, CLINTON A. HAGADONE, a citizen of the United States, residing at Western Springs, in the county of Cook and State of Illinois, have invented certain new and useful Improvements in Cutting Mechanism, of which the following is a full, clear, and exact specification.

This invention relates to cutting mechanism.

One of the objects of my invention is to improve and to render more durable cutting mechanism such as used in harvesters and the like.

Another object of my invention is to insure the maintenance of a good cutting relation between the stationary and movable knife members.

Another object of my invention is to provide a cutting mechanism which is adapted to meet all the requirements for successful commercial usage in the line for which it is intended.

These and other objects are accomplished by providing a cutting mechanism having stationary and movable knives and novel bearing means made of good wearing material and arranged to maintain the proper cutting relationship between the stationary and movable knives.

The invention is illustrated on the accompanying sheets of drawings, in which—

The various novel features of the invention will be apparent from the following description and drawings and will be particularly pointed out in the appended claims.

One of the main difficulties encountered in properly cutting corn stalks is the keeping of the stationary and movable knives in a proper cutting relation. There is a great tendency for the reciprocatory knife to be pressed up out of engagement with the stationary knives under the influence of corn stalks and weeds crowding into the cutting mechanism. This crowding of the stalks not only tends to force the reciprocatory knife away from the stationary knives by direct thrust, but also acts to cause an increased friction between the sliding parts or bearing portions to wear the same away rapidly, which in turn gives an increased leverage of the stalks on the movable knife. Among other things, this is a feature which I have attempted to overcome by means of my cutting mechanism.

Figure 1:
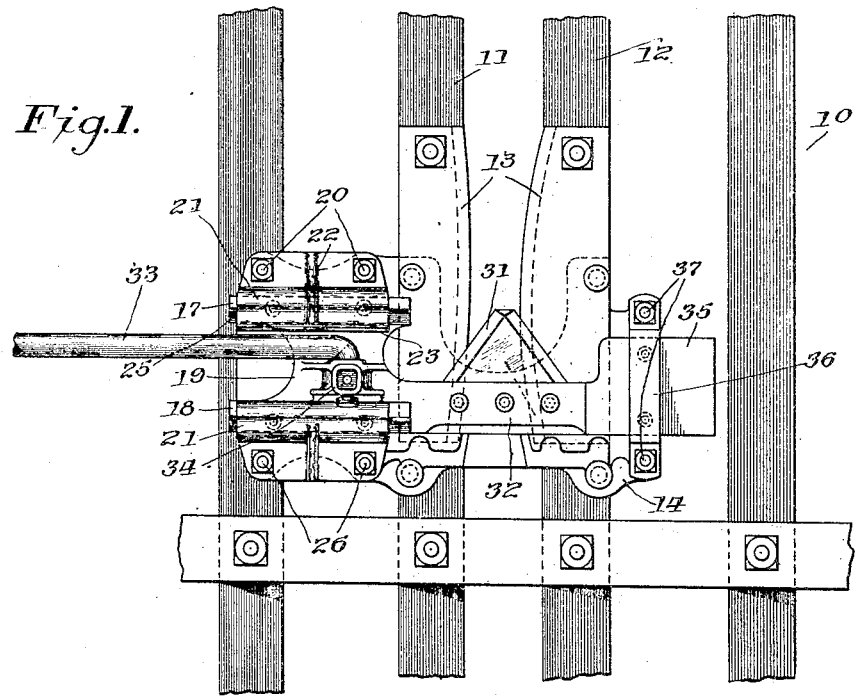
Figure 1 is a fragmentary plan view of the frame of a corn harvester provided with my improved cutting mechanism.
Figure 2:
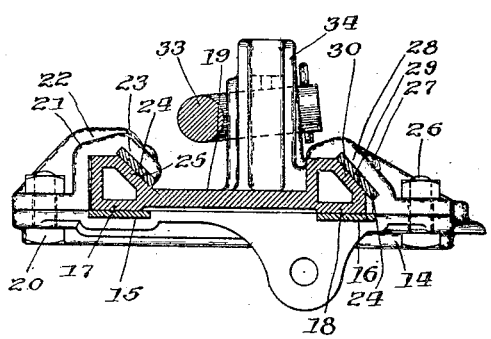
Fig. 2 is a partial sectional view of the same cutting mechanism, showing the novel bearing arrangement.
Figure 3:
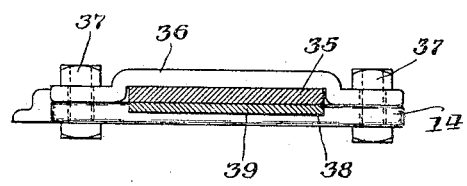
Fig. 3 is a detail view, parts being in section, showing the bearing arrangement for the outer end portion of the movable cutting member.

As shown in Fig. 1 of the drawing, there is a frame structure 10 including two frame members 11 and 12, to which are secured stationary knives 13, having oppositely arranged curved edges so that they cut the stalks with a gradual drawing stroke. Secured to the frame structure is a lower bearing plate 14 having longitudinal grooves 15 and 16, in which are located steel plates upon which coöperating horizontal sliding portions 17 and 18 of the knife head 19 may reciprocate. Suitably secured by bolts 20 to the lower bearing 14 at its front portion is an upper bearing guide member or cap 21 having a horizontally arranged portion 22 and an overhanging or rearwardly and downwardly extending portion 23, in which is fitted an inclined steel plate 24 which is adapted to coöperate with a corresponding inclined portion 25 of the knife head 19. Secured to the rear portion of the bearing member 14 by suitable bolts 26 is another bearing guide member or cap 27 having a rearwardly and downwardly extending portion 28, in which is mounted a steel plate 29 which coöperates in a sliding movement with a similar inclined portion 30 of the knife head 19. A suitable knife section 31 is secured to a narrowed portion 32 of the knife head and is arranged to coöperate with the stationary knives 13 as it is reciprocated back and forth by a suitably actuated pitman 33 pivotally connected to a vertically arranged portion 34 of the knife head. The outer end 35 of the knife head is slidably mounted between the lower bearing member 14 and a strap 36 secured thereto by suitable bolts 37. The lower bearing member at this end is provided with a groove 38, in which is located a steel bearing plate 39 which provides a good wearing surface for the outer end of the knife. As a matter of fact, all of the bearing surfaces are of hard steel or good wearing material, so that the reciprocating knife, which normally is set to engage with the stationary knives as it passes the latter, is maintained in good cutting relationship therewith. At the same time it is to be noted that the properly backed downwardly and rearwardly extending bearing portions 24 and 29 coöperate with the knife head to prevent an upward and backward tilting movement of the movable knife about the rear end thereof. In other words, by means of the downwardly and rearwardly extending bearing portions at the front and rear of the knife head, the reciprocatory knife is maintained in engagement with the stationary knives to effect efficient cutting of stalks and the like.

It is evident that there may be various modifications of the invention as herein particularly shown and described, and it is my intention to cover all such modifications which do not involve a departure from the spirit and scope of my invention as set forth in the following claims.

What I claim as new is:

1. In a cutting mechanism, the combination of a stationary knife, a movable knife coöperating therewith, a head to which said movable knife is connected having a plurality of bearing portions, one of said bearing portions extending downwardly and inwardly with respect to the longitudinal axis of said head.

2. In a cutting mechanism, a stationary knife, a knife head, and a reciprocating knife carried by said head, said knife head having a rearwardly and downwardly inclined bearing surface on its front portion.

3. In a cutting mechanism, the combination of a stationary knife, a movable knife coöperating therewith, a head to which said movable knife is connected having a plurality of bearing portions, one of said bearing portions extending downwardly and inwardly with respect to the longitudinal axis of said head, a bearing member upon which said knife head is slidably mounted, and bearing caps mounted over the bearing portions of said head to oppose a rearward and upward movement of said movable knife.

4. In a cutting mechanism, the combination of a stationary knife, a movable knife coöperating therewith, a head to which said movable knife is connected having two bearing portions, each with a horizontally arranged bearing surface and an inclined bearing surface, one of said inclined bearing surfaces being inwardly and downwardly inclined with respect to the longitudinal axis of said head, and bearing members having coöperating bearing surfaces for holding said movable knife in a given operative relationship with said stationary knife.

5. In a cutting mechanism, the combination of a stationary knife, a movable knife coöperating therewith, a head to which said movable knife is connected having a plurality of bearing portions, each with a horizontally arranged bearing surface and an inclined bearing surface, one of said inclined bearing surfaces being inwardly and downwardly inclined with respect to the longitudinal axis of said head, a lower bearing plate having bearing surfaces coöperating with said horizontal bearing surface, and caps secured to said bearing plate having inclined bearing surfaces coöperating with the inclined bearing surfaces of said knife head.

6. In a cutting mechanism, the combination of a stationary knife, a movable knife coöperating therewith, a head to which said movable knife is connected having rearwardly and downwardly extending bearing portions, and similar coöperating bearing members for holding said movable knife in a given operative relationship with said stationary knife.

7. In a cutting mechanism, the combination of a stationary knife, a movable knife coöperating therewith, a head to which said movable knife is connected having rearwardly and downwardly extending bearing portions, and bearing members having hardened bearing portions coöperating with the bearing portions on said knife head.

8. In a cutting mechanism, the combination of a stationary knife, a movable knife coöperating therewith, a head to which said movable knife is connected having a plurality of bearing portions, each provided with a horizontally arranged bearing surface and an inclined bearing surface, one of said inclined bearing surfaces being inwardly and downwardly inclined with respect to the longitudinal axis of the head, a plate provided with hardened bearing portions to coöperate with the horizontal bearing surfaces of said head, and caps secured to said plate and having inclined hardened bearing portions to coöperate with the inclined bearing surfaces of said head.

9. In a cutting mechanism, the combination of a stationary knife, a movable knife coöperating therewith, and a head to which said movable knife is secured, said head having inclined bearing surfaces, the angles of inclination of said surfaces being confined within the limits of a 90° angle formed by horizontal and vertical planes extending respectively forwardly and upwardly from the lines of intersection of said inclined surfaces with a horizontal plane.

In testimony whereof I affix my signature.

CLINTON A. HAGADONE.

Copies of this patent may be obtained for five cents each, by addressing the "Commissioner of Patents, Washington, D. C."